United States Patent [19]

Utz

[11] Patent Number: 5,425,679
[45] Date of Patent: Jun. 20, 1995

[54] CHAIN WITH SEALED JOINT AND SEALED ROLLER

[75] Inventor: Jon C. Utz, New Berlin, Wis.

[73] Assignee: Rexnord Corporation, Milwaukee, Wis.

[21] Appl. No.: 245,050

[22] Filed: May 17, 1994

[51] Int. Cl.⁶ .............................................. F16H 57/04
[52] U.S. Cl. ..................................... 474/91; 474/231; 277/92
[58] Field of Search .................. 474/91, 206, 231; 277/92, 96.2; 198/500, 838

[56] References Cited

U.S. PATENT DOCUMENTS

| | | | |
|---|---|---|---|
| 2,411,214 | 11/1946 | Keech | 286/11 |
| 3,235,315 | 2/1966 | Schnacke | 305/11 |
| 3,336,089 | 8/1967 | Krickler | 474/91 X |
| 3,341,259 | 9/1967 | Schulz et al. | 305/11 |
| 3,365,246 | 1/1968 | Otis et al. | 305/11 |
| 3,437,385 | 4/1969 | Deli | 305/11 |
| 3,643,517 | 2/1972 | Paul | 474/231 X |
| 3,675,936 | 7/1972 | Hatch | 277/94 |
| 3,731,551 | 5/1973 | Nelson | 474/91 X |
| 3,762,778 | 10/1973 | Boggs et al. | 474/91 X |
| 3,811,334 | 5/1974 | Kuenzig et al. | 474/231 |
| 3,958,836 | 5/1976 | Brown et al. | 474/91 X |
| 4,029,366 | 6/1977 | Baylor | 474/91 X |
| 4,094,515 | 6/1978 | Araya et al. | 277/92 |
| 4,094,516 | 6/1978 | Morley et al. | 277/92 |
| 4,315,750 | 2/1982 | Kawashima et al. | 474/231 X |
| 4,424,050 | 1/1984 | Sato | 474/231 |
| 4,457,521 | 7/1984 | Morley | 277/92 |
| 4,464,151 | 8/1984 | Kahl | 474/231 |
| 4,494,945 | 1/1985 | Ogino | 474/231 |
| 4,571,228 | 2/1986 | Tracy | 474/231 |
| 4,610,647 | 9/1986 | Weeds | 474/206 |
| 4,615,171 | 10/1986 | Burk | 474/231 X |
| 4,729,754 | 3/1988 | Thuerman | 474/207 |
| 5,222,920 | 6/1993 | Cheesman et al. | 474/213 |
| 5,269,729 | 12/1993 | Thuerman et al. | 474/207 |

*Primary Examiner*—Roger J. Schoeppel
*Attorney, Agent, or Firm*—Michael, Best & Friedrich

[57] ABSTRACT

The invention provides sealing members for a chain. A first pair of sealing members is provided for each end of a bushing. The sealing members of the first pair respectively surround the ends of the bushing and are housed between inner sidebar portions and the outer sidebar portions of the chain. A second pair of sealing members seals rollers surrounding the bushings.

18 Claims, 2 Drawing Sheets

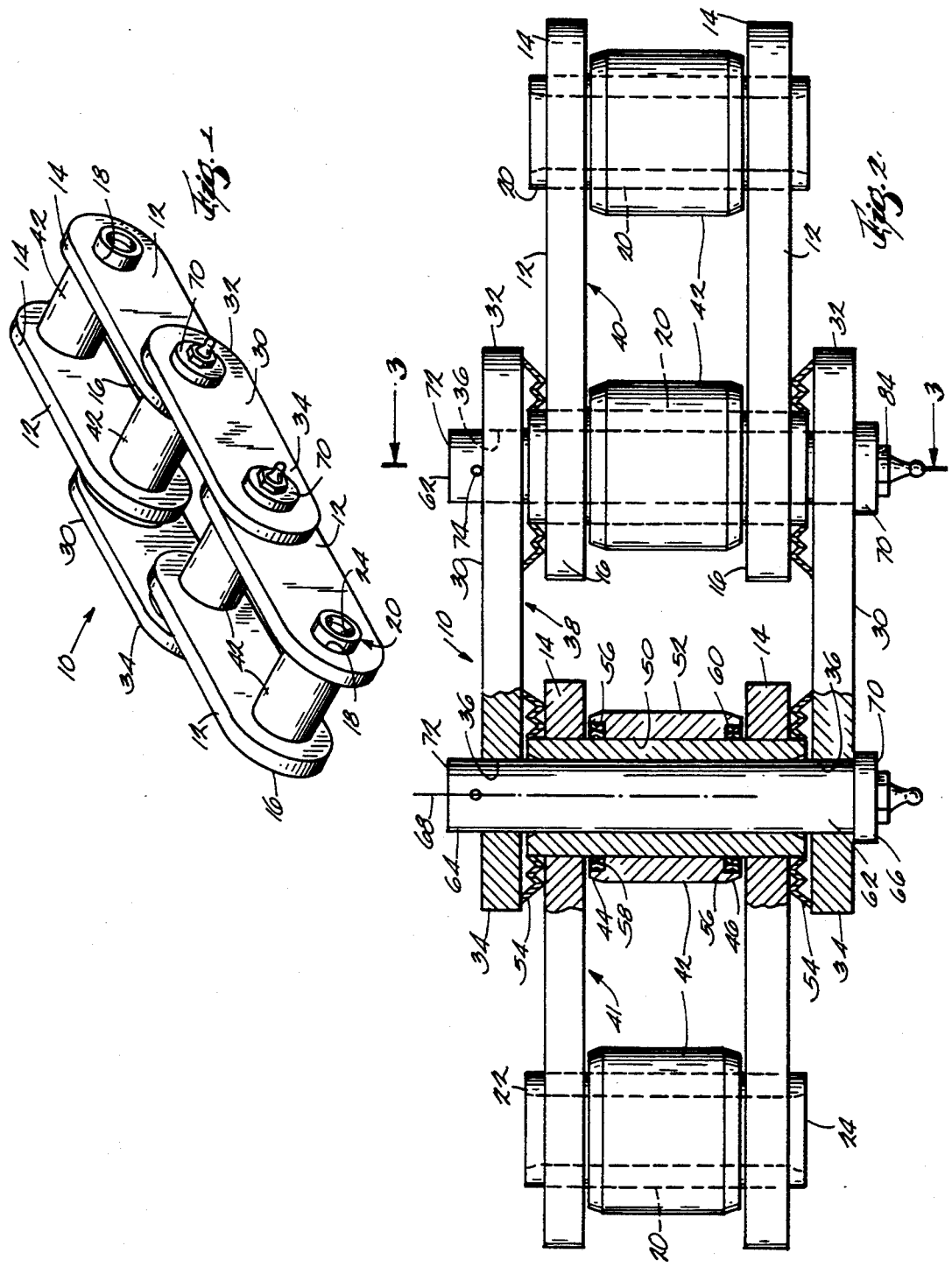

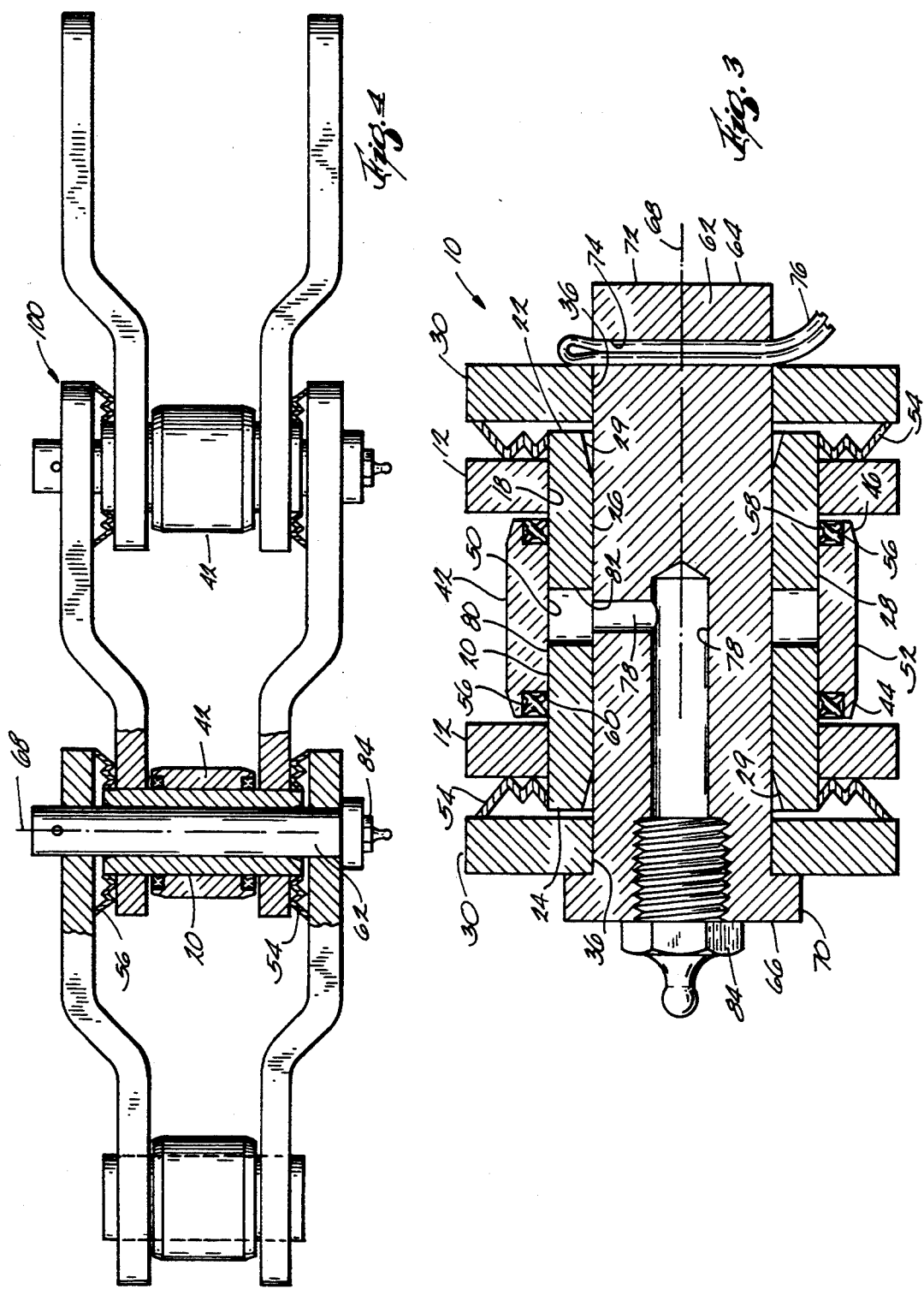

CHAIN WITH SEALED JOINT AND SEALED ROLLER

FIELD OF THE INVENTION

The invention relates generally to chains and, more particularly, to seals for chains.

BACKGROUND OF THE INVENTION

It is desirable to protect chain bearings (the wear surface between the outside diameter of a chain pin and the inside diameter of a chain bushing) by keeping the bearing lubricated and by preventing abrasive material from entering the bearing surface. See, for example, U.S. Pat. No. 4,464,151, issued to Kahl on Aug. 7, 1984, assigned to the assignee of the present invention, and incorporated herein by reference.

It is also desirable to provide a roller sealing arrangement to prevent lubricant efflux from a roller joint and contaminant influx into a roller joint, and to thereby improve the wear characteristics of the roller joint. See, for example, U.S. Pat. No. 5,222,920, issued to Cheesman et al. on Jun. 29, 1993, assigned to the assignee of the present invention, and incorporated herein by reference.

Another sealing arrangement is illustrated in U.S. Pat. No. 4,729,754, issued to Thuerman on Mar. 8, 1988, assigned to the assignee of the present invention, and incorporated herein by reference.

SUMMARY OF THE INVENTION

The invention provides a chain having a sealed chain joint, and a sealed roller.

There are various environments in which chains operated where it is desirable to have a chain with a sealed chain joint, and a sealed roller.

For example, in certain circumstances, it is desirable to provide a chain which has high clearances between components of the chain because certain chains operate in a misaligned condition. Because of the high clearances, it is desirable to provide a sealed chain joint to protect chain bearings, to keep the bearing lubricated, and to prevent abrasive material from entering the bearing surface.

The invention provides sealing members for a chain. A first pair of sealing members is provided for each end of a bushing. The sealing members respectively surround the ends of the bushing and are housed between inner sidebar portions and the outer sidebar portions of the chain. In one aspect of the invention, each sealing member of the first pair is a resilient sigma seal.

A second pair of sealing members is provided for sealing rollers surrounding the bushings. In one aspect of the invention, each sealing member of the second pair is a resilient sealing ring housed in a counterbore or groove at an end of the roller. In one aspect of the invention, each resilient sealing ring surrounds and engages the bushing in sealing relation. In one aspect of the invention, each sealing ring of the second pair is a resilient quad ring seal.

Other features and advantages of the invention will become apparent to those of ordinary skill in the art upon review of the following detailed description, claims, and drawings.

DESCRIPTION OF THE DRAWINGS

FIG. 1 is a perspective view of a straight sidebar chain embodying various features of the invention.

FIG. 2 is a top view, partially in section, of the chain of FIG. 1.

FIG. 3 is a cross sectional view taken along line 3—3 of FIG. 2.

FIG. 4 is a top view of an offset sidebar chain embodying various features of the invention.

DETAILED DESCRIPTION OF THE PREFERRED EMBODIMENT OF THE INVENTION

FIG. 1 shows a chain 10 embodying various features of the invention. The chain 10 illustrated in FIG. 1 is a straight sidebar chain. The chain 10 includes a plurality of pairs of opposed, aligned, inner sidebars 12. Each inner sidebar 12 is an integral piece having opposite portions 14 and 16. Each inner sidebar portion 14 and 16 defines an aperture 18.

The chain 10 further includes two tubular bushings 20 supported by or secured to each pair of inner sidebars 12. Each bushing 20 has opposite ends 22 and 24, respectively, an inside surface 26 having an inside diameter, and an outside surface 28 having an outer diameter. Each bushing 20 is supported by one pair of inner sidebar portions 14 or 16 and extends through the apertures 18 of the inner sidebar portions 14 or 16 and such that the ends of the bushing respectively project beyond the inner sidebar portions 14 or 16. The inside surface 26 of each bushing 20 is optionally chamfered or beveled at each end of the bushing 20. In the illustrated embodiment, each chamfer 29 has an angle of 10° relative to the cylindrical portion of the inside surface 26 and extends from the end of the bushing to slightly inside the nearest inner sidebar 12.

The chain 10 further includes a plurality of pairs of opposed, aligned outer sidebars 30. Each outer sidebar 30 is an integral piece having opposite portions 32 and 34. Each outer sidebar portion 32 and 34 defines an aperture 36 having a diameter smaller than the outside diameter of the bushing ends 22 and 24.

Each outer sidebar portion 32 of one pair 38 of outer sidebars 30 is adjacent and spaced from one of the inner sidebar portions 16 of one pair 40 of inner sidebars 12, and the aperture 36 of each outer sidebar portion 32 of the one pair 38 of outer sidebars 30 is aligned with the aperture 18 of one of the inner sidebar portions 16 of the one pair 40 of inner sidebars 12.

Each outer sidebar portion 34 of the one pair 38 of outer sidebars 30 is adjacent and spaced from one of the inner sidebar portions 14 of a pair 41 of inner sidebars 12 different from the pair 40. The aperture 36 of each outer sidebar portion 34 of the one pair 38 of outer sidebars 30 is aligned with the aperture 18 of one of the inner sidebar portions 14 of the pair 41 of inner sidebars 12.

The chain 10 further includes a tubular shaped roller 42 rotatably mounted over each bushing 20 and between opposed inner sidebars 12. Each roller 42 has opposite ends 44 and 46, an inside surface 50 having an inside diameter, and an outside surface 52 having an outside diameter. The outside surface 52 of each roller is optionally chamfered at each end 44 and 46.

The chain 10 further includes a plurality of first pairs of sealing members 54. The sealing members 54 of one of the pairs of sealing members respectively surround the bushing ends 22 and 24 of one bushing 20, and each of the sealing members 54 is housed between one of the inner sidebar portions 14 or 16, and one of the outer sidebar portions 32 or 34. Each sealing member 54 is resilient, and is in the general shape of a sigma rotated 360° about the axis of the roller 42. Such a sealing member 54 is commonly known as a sigma seal. Various other shape seals can be employed. Each resilient sealing member 54 surrounds and engages one of the bushing ends 22 or 24 and also engages in sealing relation one of the outer sidebars 30.

The chain 10 further includes a plurality of second pairs of sealing members 56 sealing the opposite ends 44 and 46 of the rollers 42. The sealing members 56 are resilient sealing rings of polymeric material. While other sealing arrangements can be employed, in the illustrated embodiment, the sealing members 56 are respectively housed in grooves or counterbores 58 and 60 in opposite ends 44 and 46 of the roller 42, and each resilient sealing member 56 surrounds and engages the bushing 20 on which the roller 42 is mounted. Other appropriate roller sealing arrangement can also be employed. For example, in one alternative embodiment of the invention, the sealing members seal the roller 42 to adjacent sidebars as shown in U.S. Pat. No. 5,222,920, issued to Cheesman et al. The illustrated sealing members 56 do not prevent rotation of a roller 42 relative to the bushing 20 on which the roller 42 is mounted. In the preferred embodiment of the invention, each of the sealing members 56 is X-shaped in cross section. Such a sealing member 56 is known as a quad ring. Various other shapes could be employed for the sealing members 56, however. For example, each sealing member 56 could be circular in cross section.

The chain 10 further includes a plurality of pins 62 respectively extending through the bushings 20 and respectively having opposite ends 64 and 66 housed in the openings in opposed outer sidebar portions 32 or 34 adjacent to the bushing ends 22 or 24 of the respective bushings 20 to form chain joints connecting pairs of inner sidebars 12 with pairs of outer sidebars 30.

Each pin 62 has a longitudinal axis 68. Each pin 62 has a head 70, and an end 72 with a cotter pin hole 74 transverse to the longitudinal axis 68 of the pin 62. The chain 10 further includes a cotter pin 76 in each cotter pin hole 74. For each chain joint, the outer sidebar portions 32 or 34, the inner sidebar portions 14 or 16, the bushing 20, the roller 42, and the sealing members 54 and 56 are located axially between the head 70 and the cotter pin 76. Further, for each chain joint, the seals 54 space the outer sidebars 30 away from the bushings 20.

Although the need for periodic lubrication of the roller joints is reduced or eliminated by the incorporation of the roller sealing arrangement disclosed herein, it may still be desirable to relubricate the roller joints between extended intervals of time to provide added protection against roller joint wear. For this reason, the chain pins 62 are generally hollow, including a lubricant passageway 78 that communicates with a clearance space 80 between the inside bearing surface 50 of the roller 42 and the outside bearing surface 28 of the bushing 20 by way of a passageway 82 in the bushing 20. The chain pins 62 also each include a removable grease fitting 84.

Shown in FIG. 4 is an offset sidebar chain 100 embodying the invention. The offset sidebar chain 100 is substantially identical to the straight sidebar chain 10, like reference numerals indicating like components, except that the sidebars are offset.

While a preferred embodiment of the invention has been described, various modifications are possible. The disclosed chain and chain link assembly configuration can be employed in any application which presently requires a chain. For example, the disclosed chain and chain link assembly configuration can be advantageously employed where a chain operates in a misaligned condition, such as in a V-press. A V-press is used in the food industry for separating liquids from solids. For example, a V-press is used to dewater alfalfa to produce cattle feed, to dewater brewers spent grain, to dewater citrus peel for pectin, to dewater fish waste for fertilizer, etc. One such V-press in which the disclosed chain and chain link assembly configuration can be advantageously employed is a Rietz V-press sold by Bepex corporation, P.O. Box 880, Santa Rosa, Calif.

The disclosed chain and chain link assembly configuration can also be advantageously employed in potentially corrosive or damaging environments, or abrasive environments.

The above described potential applications for the disclosed chain and chain link assembly configuration are given by way of example only, the chain and chain link assembly configuration disclosed and claimed herein can be employed in any application which presently requires a chain.

Further, the disclosed sealing arrangement can be employed with straight sidebars, offset sidebars, or other sidebars that are not straight sidebars.

Modifications may be made to the preferred embodiment described and illustrated herein without departing from the spirit of the invention as expressed in the following claims.

I claim:

1. A chain link assembly comprising:
    a pair of inner sidebar portions, each of said inner sidebar portions defining an aperture;
    a tubular shaped bushing having opposite ends, an inside surface having an inside diameter, an outside surface having an outside diameter, said bushing being supported by said pair of inner sidebar portions and passing through said apertures of said inner sidebar portions such that said ends of said bushing project beyond said inner sidebar portions;
    a pair of outer sidebar portions each defining an opening having a diameter smaller than the outside diameter of said bushing, one of said outer sidebar portions being adjacent to one of said ends of said bushing and the other of said outer sidebar portions being adjacent to the other of said ends of said bushing;
    a first pair of sealing members, said sealing members respectively surrounding said ends of said bushing and being housed between the inner sidebar portions and the outer sidebar portions;
    a tubular shaped roller having opposite ends, an inside surface having an inside diameter, an outside surface having an outside diameter, said roller being mounted on said bushing for rotation about an axis, between said pair of inner sidebar portions, said roller having therein a pair of grooves spaced apart in the direction of the axis;
    a second pair of sealing members, each sealing member of said second pair being housed in one of said grooves of said roller; and
    a pin extending through said bushing and having opposite ends housed in said openings in said outer sidebar portions to form a chain joint.

2. A chain link assembly in accordance with claim 1 wherein each sealing member of said second pair of sealing members comprises a resilient sealing ring.

3. A chain link assembly in accordance with claim 1 wherein each sealing member of said second pair of sealing members has a substantially X-shaped cross section.

4. A chain link assembly in accordance with claim 1 wherein each sealing member of said first pair of sealing members comprises a resilient undulating seal.

5. A chain link assembly in accordance with claim 1 wherein each sealing member of said first pair of sealing members include the general shape of a sigma rotated 360° about the axis of rotation of the roller.

6. A chain link assembly in accordance with claim 1 wherein said pin has therein a lubrication passage, and wherein said bushing has therethrough a radial lubricating bore communicating with said lubrication passage and located axially between said sealing members of said second pair.

7. A chain link assembly in accordance with claim 1 wherein said inner surface of said bushing is chamfered at each of said ends of said bushing.

8. A chain link assembly in accordance with claim 1 wherein said outer surface of said roller is chamfered at each of said ends of said roller.

9. A chain link assembly in accordance with claim 1 wherein at least one of said grooves in said roller circumscribes and is contiguous with said inside surface of said roller.

10. A chain link assembly in accordance with claim 1 wherein said sealing members of said second pair surround and sealingly engage said bushing.

11. A chain link assembly in accordance with claim 1 wherein each sealing member of said first pair maintains the outer sidebar that it engages in spaced relation from said bushing.

12. A chain link assembly in accordance with claim 1 wherein said pin has a longitudinal axis, wherein one of said opposite ends of said pin has a head, wherein the other of said opposite ends of said pin has a cotter pin hole transverse to the longitudinal axis of said pin, wherein said chain link assembly further includes a cotter pin in said cotter pin hole of said pin, wherein said outer sidebar portions, said inner sidebar portions, said bushing, and said first pair of sealing members, and said second pair of sealing members are located between said head and said cotter pin, wherein one of said sealing members of said first pair maintains the outer sidebar that it engages against said head, and wherein the other one of said sealing members of said first pair maintains the outer sidebar that it engages against said cotter pin.

13. A chain link assembly in accordance with claim 1, wherein said inner and outer sidebar portions are portions of straight sidebars.

14. A chain in accordance with claim 1, wherein said inner and outer sidebar portions are portions of offset sidebars.

15. A chain link assembly comprising:
a pair of inner sidebar portions, each of said inner sidebar portions defining an aperture;
a tubular shaped bushing having opposite ends, an inside surface having an inside diameter, an outside surface having an outside diameter, said bushing being supported by said pair of inner sidebar portions and passing through said apertures of said inner sidebar portions such that said ends of said bushing project beyond said inner sidebar portions;
a pair of outer sidebar portions each defining an opening having a diameter smaller than the outside diameter of said bushing, one of said outer sidebar portions being adjacent to one of said ends of said bushing and the other of said outer sidebar portions being adjacent to the other of said ends of said bushing;
a first pair of sealing members, said sealing members respectively surrounding said ends of said bushing and being housed between the inner sidebar portions and the outer sidebar portions;
a tubular shaped roller having opposite ends, an inside surface having an inside diameter, an outside surface having an outside diameter, said roller being rotatably mounted on said bushing, between said pair of inner sidebar portions;
a second pair of sealing members, said sealing members of said second pair respectively being housed at either end of said roller, between said roller and said bushing; and
a pin extending through said bushing and having opposite ends housed in said openings in said outer sidebar portions to form a chain joint.

16. A chain link assembly comprising:
a pair of inner sidebar portions, each of said inner sidebar portions defining an aperture;
a tubular shaped bushing having opposite ends, an inside surface having an inside diameter, an outside surface having an outside diameter, said bushing being supported by said pair of inner sidebar portions and passing through said apertures of said inner sidebar portions such that said ends of said bushing project beyond said inner sidebar portions;
a pair of outer sidebar portions each defining an opening having a diameter smaller than the outside diameter of said bushing, one of said outer sidebar portions being adjacent to one of said ends of said bushing and the other of said outer sidebar portions being adjacent to the other of said ends of said bushing;
a first pair of sealing members, said sealing members respectively surrounding said ends of said bushing and being housed between the inner sidebar portions and the outer sidebar portions;
a tubular shaped roller having opposite ends, an inside surface having an inside diameter, an outside surface having an outside diameter, said roller being rotatably mounted on said bushing, between said pair of inner sidebar portions, each end of said roller having a counterbore;
a resilient sealing ring housed in each said counterbore, each said resilient sealing ring surrounding and engaging one of said ends of said bushing; and
a pin extending through said bushing and having opposite ends housed in said openings in said outer sidebar portions to form a chain joint.

17. A straight sidebar chain comprising:
a plurality of opposed, aligned pairs of inner sidebars, each of said inner sidebars comprising two inner sidebar portions, each inner sidebar portion defining an aperture;
a plurality of tubular bushings each having opposite ends, an inside surface having an inside diameter, an outside surface having an outside diameter, two said bushings being supported by one of said pairs of inner sidebar portions such that said bushings pass through said apertures of said inner sidebar portions and said ends of each bushing project beyond said inner sidebar portions;

a plurality of opposed, aligned pairs of outer sidebars, each of said outer sidebars comprising two outer sidebar portions, each outer sidebar portion defining an opening having a diameter smaller than the outside diameter of said bushing ends, one of said outer sidebar portions of one pair of outer sidebars being adjacent to one of said ends of one bushing and the opposed outer sidebar portion of the pair of outer sidebars being adjacent to the other of said ends of the one bushing;

a plurality of pairs of resilient sealing members, one pair of sealing members being mounted on each bushing, with respective sealing members of each pair surrounding respective ends of each bushing, and with each of said sealing members being housed between one of said inner sidebar portions and one of said outer sidebar portions, each of said sealing members being a resilient sigma seal;

a tubular shaped roller rotatably mounted on each bushing, between one of said pairs of inner sidebar portions, each roller having opposite ends, an inside surface having an inside diameter, and an outside surface having an outside diameter, each end of said roller having therein a counterbore;

a resilient sealing ring in each counterbore, each said resilient sealing ring surrounding and engaging one of said bushings; and a plurality of pins respectively extending through said bushings and respectively having opposite ends housed in said openings in opposed outer sidebar portions adjacent to said bushing extensions of respective bushings to form chain joints that respectively connect pairs of inner sidebars with pairs of outer sidebars.

18. An offset sidebar chain comprising:

a plurality of opposed, aligned pairs of inner sidebars portions, each inner sidebar portion defining an aperture;

a plurality of tubular bushings each having opposite ends, an inside surface having an inside diameter, an outside surface having an outside diameter, two said bushings being supported by one of said pairs of inner sidebar portions such that said bushings pass through said apertures of said inner sidebar portions and said ends of each bushing project beyond said inner sidebar portions;

a plurality of opposed, aligned pairs of outer sidebars portions, each outer sidebar portion defining an opening having a diameter smaller than the outside diameter of said bushing ends, one of said outer sidebar portions of one pair of outer sidebars being adjacent to one of said ends of one bushing and the opposed outer sidebar portion of the pair of outer sidebars being adjacent to the other of said ends of the one bushing;

a plurality of pairs of resilient sealing members, one pair of sealing members being mounted on each bushing, with respective sealing members of each pair surrounding respective ends of each bushing, and with each of said sealing members being housed between one of said inner sidebar portions and one of said outer sidebar portions, each of said sealing members being a resilient sigma seal;

a tubular shaped roller rotatably mounted on each bushing, between one of said pairs of inner sidebar portions, each roller having opposite ends, an inside surface having an inside diameter, and an outside surface having an outside diameter, each end of said roller having therein a counterbore;

a resilient sealing ring in each counterbore, each said resilient sealing ring surrounding and engaging one of said bushings; and a plurality of pins respectively extending through said bushings and respectively having opposite ends housed in said openings in opposed outer sidebar portions adjacent to said bushing extensions of respective bushings to form chain joints that respectively connect pairs of inner sidebar portions with pairs of outer sidebar portions.

* * * * *